(12) United States Patent
Bates et al.

(10) Patent No.: US 10,140,308 B2
(45) Date of Patent: *Nov. 27, 2018

(54) ENHANCING DATA RETRIEVAL PERFORMANCE IN DEDUPLICATION SYSTEMS

(75) Inventors: Allen Keith Bates, Tucson, AZ (US); Louie Arthur Dickens, Tucson, AZ (US); Stephen Leonard Schwartz, Tucson, AZ (US); Daniel James Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/412,728

(22) Filed: Mar. 6, 2012

(65) Prior Publication Data

US 2013/0238568 A1    Sep. 12, 2013

(51) Int. Cl.
| | |
|---|---|
| *G06F 7/00* | (2006.01) |
| *G06F 17/00* | (2006.01) |
| *G06F 12/00* | (2006.01) |
| *G06F 17/30* | (2006.01) |
| *G06F 12/0871* | (2016.01) |
| *G06F 12/0888* | (2016.01) |
| *G06F 12/123* | (2016.01) |

(52) U.S. Cl.
CPC .... *G06F 17/30156* (2013.01); *G06F 12/0871* (2013.01); *G06F 12/0888* (2013.01); *G06F 12/123* (2013.01); *G06F 17/30132* (2013.01); *G06F 17/30902* (2013.01)

(58) Field of Classification Search
None
See application file for complete search history.

(56) References Cited

U.S. PATENT DOCUMENTS

| | | | |
|---|---|---|---|
| 7,185,163 B1 * | 2/2007 | Knight et al. | 711/165 |
| 7,949,637 B1 * | 5/2011 | Burke | G06F 3/0605 707/655 |
| 8,204,862 B1 * | 6/2012 | Paulzagade et al. | 707/679 |
| 9,235,588 B1 * | 1/2016 | Vaikar | G06F 17/3015 |
| 2006/0171588 A1 * | 8/2006 | Chellapilla | G06K 9/6828 382/185 |
| 2010/0088448 A1 * | 4/2010 | Min | G06F 9/44521 710/301 |
| 2010/0106691 A1 | 4/2010 | Preslan et al. | |
| 2011/0161291 A1 | 6/2011 | Taleck et al. | |
| 2011/0191522 A1 * | 8/2011 | Condict | G06F 12/123 711/103 |
| 2011/0276780 A1 * | 11/2011 | Sengupta et al. | 711/216 |
| 2013/0007854 A1 * | 1/2013 | Sorenson et al. | 726/5 |

(Continued)

FOREIGN PATENT DOCUMENTS

WO    WO2011099975 A1    8/2011

*Primary Examiner* — David T. Brooks
(74) *Attorney, Agent, or Firm* — Griffiths & Seaton PLLC

(57) ABSTRACT

Various embodiments for processing data in a data deduplication system are provided. For data segments previously deduplicated by the data deduplication system, a supplemental hot-read link is established for those of the data segments determined to be read on at least one of a frequent and recently used basis. Other system and computer program product embodiments are disclosed and provide related advantages.

6 Claims, 4 Drawing Sheets

100

| Hash Digest | Tally of Usage during Reads | Primary Link | Hot Read -Link |
|---|---|---|---|
| 102 | 104 | 106 | 108 |
| ADEF1234CCC | 20 | T: \tape\123456 | H: \cache \872 |
| FFDDCC12345 | 19 | T: \tape\234567 | H: \cache \872 |
| BBCC1234FFF | 3 | T: \tape\345678 | NA |
| DEFABCDD113 | 2 | T: \tape\456789 | NA |

(56) References Cited

U.S. PATENT DOCUMENTS

2013/0173627 A1\* 7/2013 Apte et al. .................... 707/741
2013/0238832 A1\* 9/2013 Dronamraju .......... G06F 3/0608
  711/103

\* cited by examiner

| Hash Digest 102 | Tally of Usage during Reads 104 | Primary Link 106 | Hot Read -Link 108 |
|---|---|---|---|
| ADEF1234CCC | 20 | T:\tape\123456 | H:\cache\872 |
| FFDDCC12345 | 19 | T:\tape\234567 | H:\cache\872 |
| BBCC1234FFF | 3 | T:\tape\345678 | NA |
| DEFABCDD113 | 2 | T:\tape\456789 | NA |

ENHANCING DATA RETRIEVAL PERFORMANCE IN DEDUPLICATION SYSTEMS

BACKGROUND OF THE INVENTION

Field of the Invention

The present invention relates in general to computers, and more particularly to a system and computer program product for enhancing data storage and retrieval performance in computing storage environments having integrated data deduplication systems.

Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

Many multi-tiered/multi-system computing environments implement data deduplication technologies to improve storage performance by reducing the amount of duplicated storage across storage devices. Data deduplication systems are increasingly utilized because they help reduce the total amount of physical storage that is required to store data. This reduction is accomplished by ensuring that duplicate data is not stored multiple times. Instead, for example, if a chunk of data matches with an already stored chunk of data, a pointer to the original data is stored in the virtual storage map instead of allocating new physical storage space for the new chunk of data.

Conventional data deduplication methodologies focus on the data write process (i.e., the process by which data segments are written through the data deduplication system after being analyzed for deduplication with a previously existing file). These systems discretize the data into data chunks, which are deduplicated via a HASH algorithm. If a given data chunk is determined to be a duplicate, as identified by the HASH digest, the duplicate chunk is currently replaced by a link to the primary chunk.

While implementing data deduplication functionality in computing storage environments have resulted in significant gains in data storage efficiency, conventional data deduplication functionality is not yet exploited to its full potential to enhance data storage and retrieval performance in computing environments. Improvements to the mechanisms by which data is stored and retrieved through such data deduplication systems are beneficial and highly desirable.

In view of the foregoing, various embodiments for improving data storage and retrieval performance in a computing environment incorporating a data deduplication system are provided. In one embodiment, by way of example only, a method for processing data in a data deduplication system by a processor is provided. For data segments previously deduplicated by the data deduplication system, a supplemental hot-read link is established for those of the data segments determined to be read on at least one of a frequent and recently used basis.

In addition to the foregoing exemplary embodiment, various system and computer program embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2 is a block diagram showing an exemplary table of HASH digests and a running tally of data usage during the reading of such data;

DETAILED DESCRIPTION OF THE DRAWINGS

As previously indicated, current deduplication systems tend to focus on the write process of data to minimize the number of writes of duplicate data to storage. In contrast, the illustrated embodiments focus on the reading of previously-deduplicated files, in conjunction with data deduplication functionality, to enhance data retrieval and improve performance in computing storage environments.

To further illustrate, consider the following exemplary embodiment. In such embodiment, a prior determination is made as to whether certain files are Most Frequently Used (MFU). In other words, these files are determined to have a substantially higher frequency of read activity in the storage environment. These MFU files may be stored in cache and accessed via a hot-read link, which supplements, but does not replace, a primary link. As such, if a subsequent read request for one of these MFU files occurs, the supplemental hot-read link may be used to quickly access the data segment in cache, rather than repetitively request the same file from disk or tape storage, for example. Such a mechanism lessens network traffic and improves storage performance.

The illustrated embodiments may implement a table of HASH digests to assist in determining which of the data segments in a given storage are called upon on a frequent or recently used basis, for example. Pursuant to each read operation involving data segments so identified, their corresponding HASH entries are incremented. An associated primary link and designated supplemental hot-read link may also be configured in this HASH table.

In using the mechanisms of the illustrated embodiments, and as one of ordinary skill in the art will appreciate, the same chunk of data can be used in multiple files. When these files are being read, the mechanisms of the illustrated embodiments serve to alleviate the necessity of obtaining the same chunk of data from potentially deep down the storage ladder. If certain HASH digests stand out as, for example, MFU digests during ensuing read processes, then those chunks are stored locally, in cache, rather than in remote storage, such as hard drives or tape. This way, the performance of the recombination of chunks into files during the read process is improved, as the MFU chunks are handily convenient. In an alternative embodiment, the Most Recently Used (MRU) chunks may be tracked. A running window on the tally may be employed, so that stale chunks are not retained in cache memory.

Figure 1:
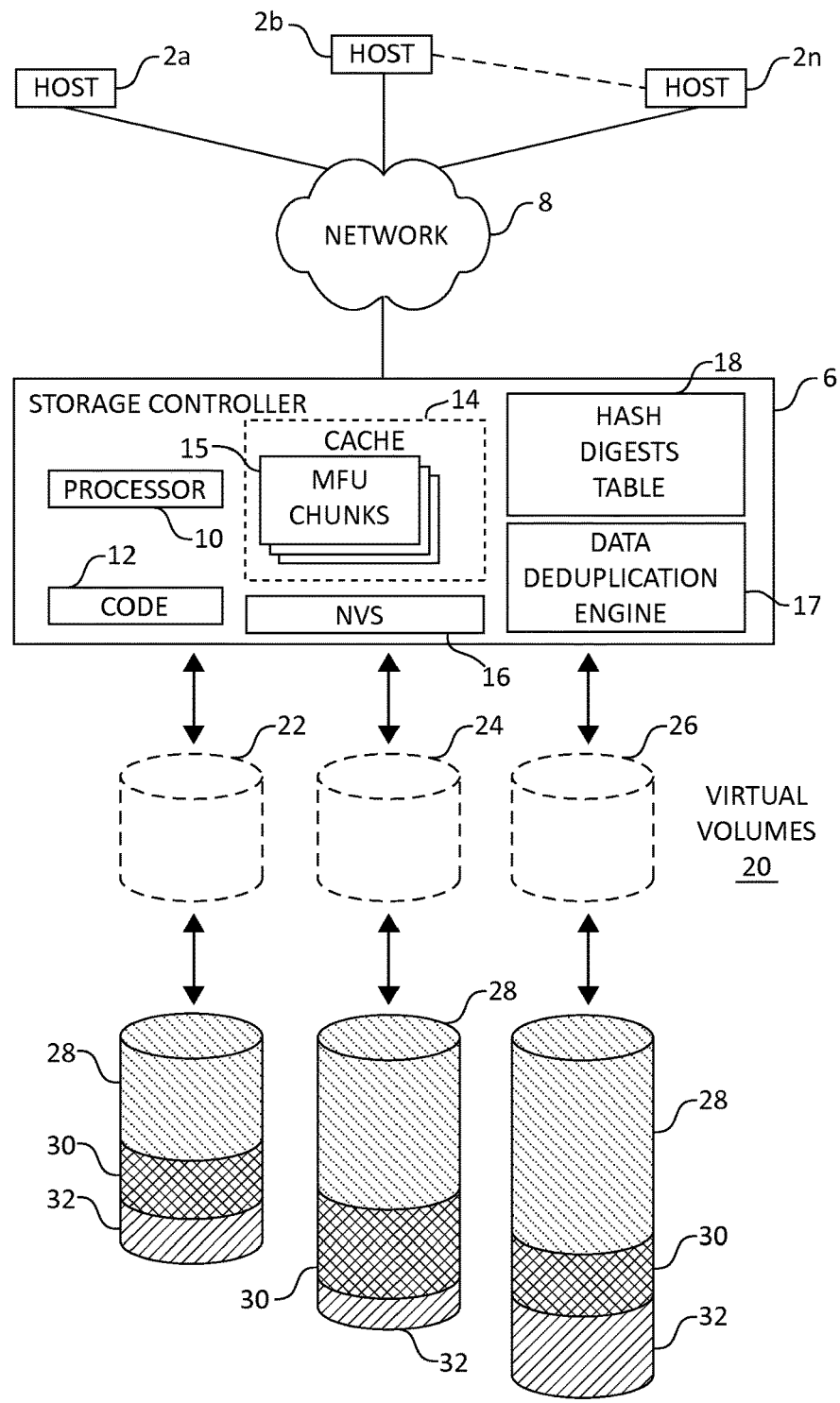
FIG. 1 is a block diagram illustrating an exemplary computing environment which may implement aspects of the present invention.

In the following description, reference is made to the accompanying drawings which form a part hereof and which illustrate several embodiments of the present invention. It is understood that other embodiments may be utilized and structural and operational changes may be made without departing from the scope of the present invention. FIG. 1 illustrates a computing storage environment in which aspects of the invention may be implemented. A plurality of host systems 2a, b . . . n transmit Input/Output (I/O) requests to one or more storage volumes 28, 30, and 32 through a storage controller 6 which manages access to the storage volumes 28, 30, and 32. In certain implementations, the storage volumes may be physically comprised of a plurality of hard disk drives organized as Just a Bunch of disks (JBOD), a RAID array, Direct Access Storage Devices (DASD), SSD, tape devices, etc.

A number of virtual volumes 22, 24, and 26 are presented to the host systems 2a, b . . . n in lieu of presenting a number of physical or logical volumes (often which may be physically configured in a complex relationship). The host systems 2a, b . . . n may communicate with the storage controller 6 over a network 8, such as the Internet, a Storage Area Network (SAN), an Intranet, Local Area Network (LAN), Wide Area Network (WAN), etc., using multiple communication protocols such as TCP/IP, Fibre Channel, Ethernet, etc. at different layers in a protocol stack.

The storage controller 6 includes a processor 10 executing code 12 to perform storage controller operations. The storage controller 6 further includes a cache 14 and non-volatile storage unit 16, such as a battery backed-up memory device. The storage controller 6 stores in cache 14 data updates received from the hosts 2a, b . . . n to write to the virtual storage volumes 22, 24, and 26 (and thereby to volumes 28, 30, and 32) as well as data read from the volumes 28, 30, and 32 to return to the hosts 2a, b . . . n. When operating in Fast Write mode, data updates received from the hosts 2a, b . . . n are copied to both cache 14 and the NVS 16. End status is returned to the host 2a, b . . . n sending the data update after the update is copied to both the cache 14 and NVS 16.

Storage controller 6 also includes a data deduplication engine 17 in communication with a storage management module 18 as will be further described. Data deduplication engine 17 is configured for performing, in conjunction with processor 10, data deduplication operations on write data passed through storage controller 6 to virtual volumes 20 and volumes 28, 30, and 32.

Cache system 14 accepts write data from hosts 2a, b . . . n or similar devices, that is then placed in cache memory. Data deduplication engine 17 then tests the write data for duplication in the cache memory 14 before the write data (should the data be determined necessary to be written) is ultimately written to storage 28, 30, and 32. In the illustrated embodiment, cache 14 includes Most Frequently Used (MFU) data chunks 15, as shown. The MFU chunks 15 are representative of most frequently read, previously deduplicated files, which are deposited in cache for quick retrieval in lieu of reading from hardened storage. As previously described, these MFU chunks have been determined to be frequently read; as such this data is retained in cache versus a hardened storage location.

FIG. 1, as one of ordinary skill in the art will appreciate, may illustrate a portion of a larger, multi-system/multi-cluster storage environment having a number of interrelated components such as the previously illustrated storage controller 6. As previously indicated, while virtual volumes 22, 24, and 26 are presented to the user via the host systems 2a, b . . . n, the underlying physical configuration may take many possible forms. For example, a number of interrelated storage devices in various classes, such as SSD, HDD, tape, optical disk such as DVD or Blu-Ray, etc. may comprise the storage volumes 28, 30, and 32 depending on a particular configuration.

Various components of the storage environment, such as processor 10, may be adapted to implement aspects of the present invention and following claimed subject matter. For example, a hash digests table 18 may operate in conjunction with processor 10 to perform various functionality to be further described, such as providing information to determine which of the read data chunks are read most frequently and/or read most recently. One of ordinary skill in the art will appreciate that other various data processing and memory components may be implemented to realize these aspects, and may be operational on the storage controller 6, or elsewhere. Cache 14, along with other components, may further comprise a variety of additional modules as will be further described to implement various portions of functionality. For example, in one embodiment, the cache 14 may further comprise modules for I/O monitoring, and a data placement module for storing MFU data chunks in the cache 14, for example. Such modules are not illustrated for purposes of convenience but would be understood to someone of ordinary skill in the art.

Turning to FIG. 2, an exemplary table 100 of HASH digests are depicted, in which aspects of the present invention may be implemented as previously described, for example exemplary table 100 is one embodiment of HASH digests table 18 in FIG. 1. HASH digests 102 are listed in succession for each read chunk of previously deduplicated files as shown. When the HASH digests 102 are used in a subsequent read operation to re-aggregate chunks into a requested file, for example, the tally 104 is increased for the used HASH digest. The first two entries of tally 104 in the table 100 (i.e., 20, 19) indicate that those hash digests are used much more frequently than the last two entries (i.e., 3, 2). In one embodiment, each HASH digest 102 used in deduplication has an associated primary link 106 as depicted. In addition, those HASH digests 102 identified/determined as MFU chunks have a supplemental hot-read link 108 (i.e., those digests having tallies 20 and 19, respectively). In an additional embodiment, the table 100 of HASH digests may include those data segments identified as MFU chunks and MRU (Most Recently Used) chunks, or alternatively, MRU chunks individually. The MRU determination may be used in an alternative embodiment to identify data chunks to deposit in the cache. An alternative embodiment comprises gathering hash digests in column 102 specific to a desired application, such as financially-related chunks when it is time to process a payroll, image-related chunks when it is time to read medical X-rays, and mpeg-related chunks when it is time to process video-streams.

Here again, the mechanisms of the illustrated embodiments take advantage of the fact that the same chunk of data may be used in multiple files, and when these files are being read, it is much more efficient to obtain the same chunk from a readily accessible location rather than from hardened storage deep in the storage ladder (again, such as tape devices, which have high latency). A running window for tally 104, the mechanisms therewith to be further described, may be employed such that stale chunks are not retained in the cache. Such a running window may vary in duration by hour, work-shift, day, week, or by the current application being run. By application being run, it is meant that when a change is made from a spreadsheet processing application to video processing application, the chunks read by the former application are unlikely to be needed by the new application and it is time to flush the chunk read-cache.

Figure 3:
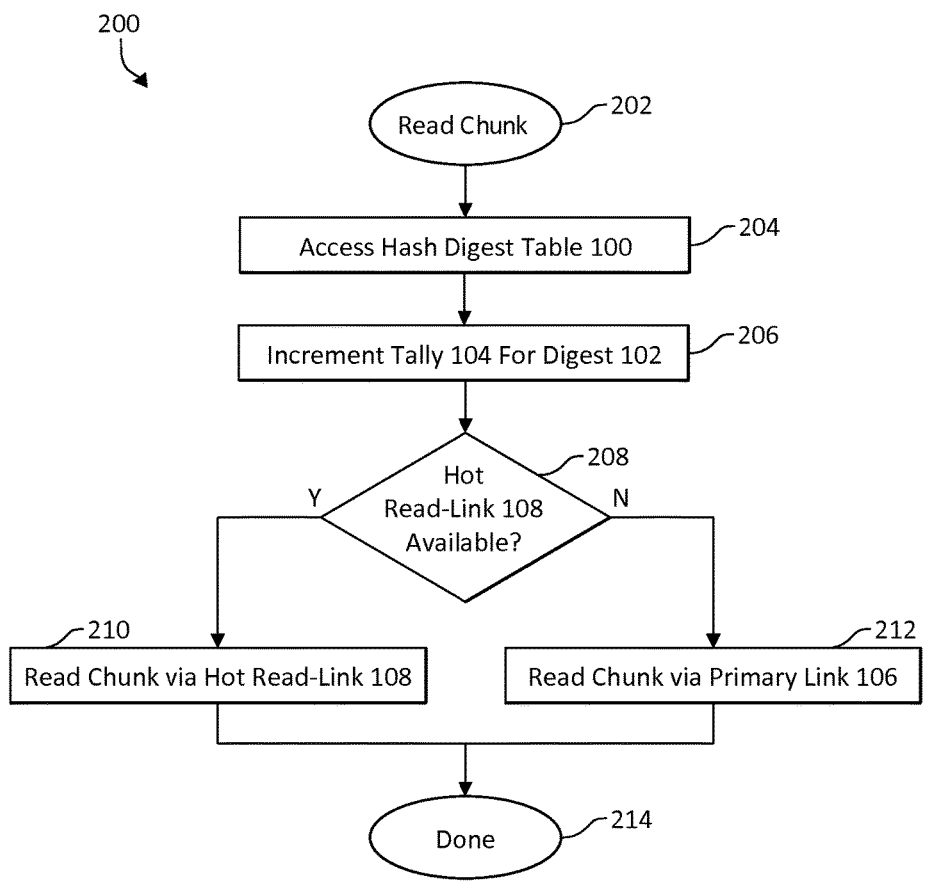
FIG. 3 is a flow chart diagram of an exemplary read-chunk process, again in which aspects of the present invention may be implemented.

In FIG. 3, following, a flow chart of an exemplary read chunk process 200, again in which aspects of the illustrated embodiments may be incorporated, is shown. The process 200 begins by accessing the hash digest table 100 (FIG. 2, previously) (step 204). Then the read-tally 104 for digest 102 is incremented (step 206). In a following step, the read-chunk process then queries whether a hot-read link 108 is available (step 208). If so, the process flows to step 210, where the desired chunk is quickly read via the hot-read link 108. Alternatively, if a hot-read link 108 is not available, as may be indicated, in one embodiment, by an error code such as NA (Not Available), or some other code (e.g., hexadecimal FFFF), then the process 200 flows to step 212, where the desired chunk is read via its primary link 106 deeper in the storage ladder, such as from a tape library.

It may be noted that any data chunk may always be read from its primary link 106; however, in the interest of performance, hot chunks have a supplemental hot-read link 108, which enables them to be retrieved faster in order to improve performance and mitigate unnecessary network traffic.

Figure 4:
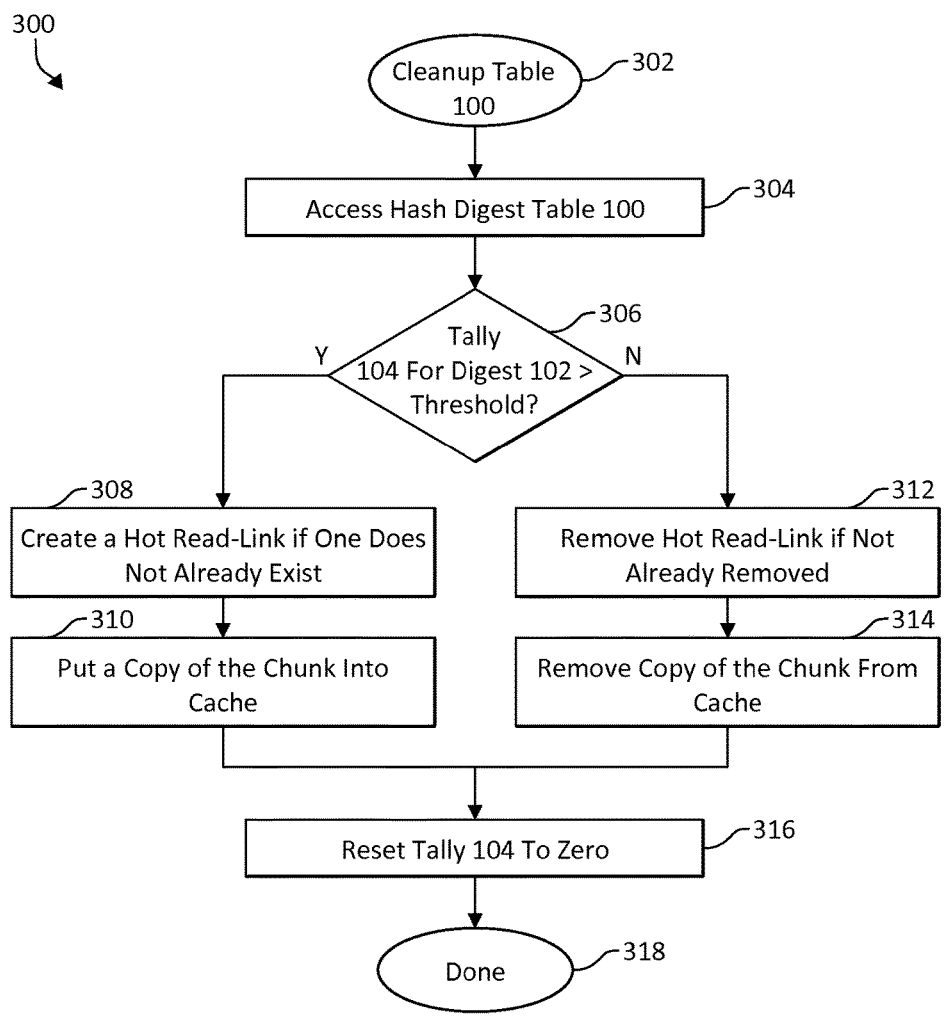
FIG. 4 is a flow chart diagram of an exemplary cleanup table process, again in which aspects of the present invention may be implemented.

Turning now to FIG. 4, a flow chart of an exemplary cleanup table process 300 for HASH table 100 (FIG. 2) is illustrated. Process 300 begins (step 302) by indicating the periodic cleanup access to HASH table 100 (step 304). As a following step, the query is made whether each tally 104 for HASH digest 102 exceeds a user or system-defined threshold (step 306). A system-defined threshold refers to, in one embodiment, where there is only so much cache, and the threshold is adjusted to prevent overflow of that cache.

If the answer to the query is affirmative in step 306, a hot-read link 108 is created in step 308, if one does not already exist. In step 310, an associated copy of that chunk is placed in cache without removing the chunk from its primary location, if the chunk is not already there. If the answer to the query is negative (again, step 306), the hot-read link 108 is removed (step 312) if it has not already been removed, and replaced by an error "do not use" code such as NA or FFFF as previously indicated. Next, in step 314, that copy of the chunk is removed from cache, unless it is already removed, and future access to the chunk is from its primary location in the storage ladder. Both steps 310 and 312 flow to optional step 316, where tally 104 is then reset to zero. Step 316 allows the use of process 300 on a periodic basis, be it hourly, daily, weekly, monthly, or due to change in application being run, to clean out the cache and prevent previous high-tally chunks, which are now unread and stale, from dominating new and upcoming chunks which are actively being read.

As one of ordinary skill in the art will appreciate, the various steps in processes 200 and 300 may be varied to suit a particular application. Here again, various considerations may be undertaken to obtain a specific data chunk, such as the MFU and MRU considerations previously described, and may be combined with other factors related to I/O activity or other storage characteristics that would be apparent to one of ordinary skill in the art.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "process" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or a Digital Versatile Disk read-only memory (DVD-ROM) or a Blu-Ray read-only memory (BD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, or entirely on the remote computer or server, or from a custom "APP" application on a smart phone. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for processing data, comprising:
a data deduplication engine; and
a storage processor in communication with the data deduplication engine, wherein the storage processor is configured for, for data segments previously deduplicated by the data deduplication engine, establishing a supplemental hot-read link, that is associated with and supplements a primary link, for those of the data segments determined to be read on a frequent and recently used basis; wherein the primary link is used to access the data segments during a first read operation and the supplemental hot-read link is used to access those of the data segments determined to be read on the frequent and recently used basis during a subsequent read operation after the determining,
storing in a cache those of the data segments determined to be read on a most recently used (MRU) and most frequently used (MFU) basis; wherein the primary link points to those of the data segments stored on a hard disk or tape storage drive and the supplemental hot-read link points to those of the data segments stored in the cache;
establishing an application-specific table of hash digests to track read activity of the previously deduplicated data segments that are the MRU and the MFU;
configuring the supplemental hot-read link and the primary link in the table of hash digests by storing, for each of the data segments, a hash digest and corresponding primary link and a tally of a usage of reads; wherein the supplemental hot-read link is additionally stored with the hash digest for those of the data segments determined to be the MRU and MFU;
using a threshold to determine which of the data segments are the MRU and the MFU;
preventing an overflow of the cache by adjusting the threshold;
for a read-access request for one of the data segments that are the MRU and the MFU, determining if the supplemental hot-read link is established, wherein:
if the supplemental hot-read link is established, reading the data segment that is the MRU and the MFU associated by the supplemental hot-read link, and
if the supplemental hot-read link is not established, providing an indication that the supplemental hot-read link is not established and alternatively reading from the primary link for the data segment that is the MRU and the MFU;
performing a cleanup operation of the table of hash digests; and
pursuant to establishing the table, if the data segment that is the MRU and the MFU exceeds the threshold, creating the supplemental hot-read link if the supplemental hot-read link is not preexisting, and storing a copy of the data segment that is the MRU and the MFU in the cache without removing the data segment that is the MRU and the MFU in a primary storage location.

2. The system of claim 1, wherein the storage processor is further configured for, during the cleanup operation, if the MRU and MFU data segments do not exceed the threshold, removing the supplemental hot-read link if the supplemental hot-read link is preexisting, and removing the copy of the MRU and MFU data segments from the cache.

3. The system of claim 1, wherein the storage processor is further configured for, for a read-access operation for those of the previously deduplicated data segments determined to be read on the MRU and MFU basis, incrementing an entry in the table of hash digests.

4. A computer program product for processing data in a data deduplication system by a processor, the computer program product comprising a non-transitory computer-readable storage medium having computer-readable program code portions stored therein, the computer-readable program code portions comprising:

a first executable portion for, for data segments previously deduplicated by the data deduplication system, establishing a supplemental hot-read link, that is associated with and supplements a primary link, for those of the data segments determined to be read on a frequent and recently used basis; wherein the primary link is used to access the data segments during a first read operation and the supplemental hot-read link is used to access those of the data segments determined to be read on the frequent and recently used basis during a subsequent read operation after the determining;

a second executable portion for storing in a cache those of the data segments determined to be read on a most recently used (MIRU) and most frequently used (MFU) basis; wherein the primary link points to those of the data segments stored on a hard disk or tape storage drive and the supplemental hot-read link points to those of the data segments stored in the cache;

a third executable portion for establishing an application-specific table of hash digests to track read activity of the previously deduplicated data segments that are the MRU and the MFU;

a fourth executable portion for configuring the supplemental hot-read link and the primary link in the table of hash digests by storing, for each of the data segments, a hash digest and corresponding primary link and a tally of a usage of reads; wherein the supplemental hot-read link is additionally stored with the hash digest for those of the data segments determined to be the MRU and MFU;

a fifth executable portion for using a threshold to determine which of the data segments are the MRU and the MFU;

a sixth executable portion for preventing an overflow of the cache by adjusting the threshold;

a seventh executable portion for, for a read-access request for one of the data segments that are the MIRU and the MFU, determining if the supplemental hot-read link is established, wherein:
  if the supplemental hot-read link is established, reading the data segment that is the MIRU and the MFU associated by the supplemental hot-read link, and
  if the supplemental hot-read link is not established, providing an indication that the supplemental hot-read link is not established and alternatively reading from the primary link for the data segment that is the MRU and the MFU;

an eighth executable portion for performing a cleanup operation of the table of hash digests; and a ninth executable portion for, if the data segment that is the MRU and the MFU exceeds the threshold, creating the supplemental hot-read link if the supplemental hot-read link is not preexisting, and storing a copy of the data segment that is the MRU and the MFU in the cache without removing the data segment that is the MRU and the MFU in a primary storage location.

5. The computer program product of claim 4, further including a tenth executable portion for, during the cleanup operation,
  if the MRU and MFU data segments do not exceed the threshold, removing the supplemental hot-read link if the supplemental hot-read link is preexisting, and removing the copy of the MRU and MFU data segments from the cache.

6. The computer program product of claim 4, further including a tenth executable portion for, for a read-access operation for those of the previously deduplicated data segments determined to be read on the at least one of the frequent and recently used basis, incrementing an entry in the table of hash digests.

* * * * *